United States Patent [19]
Loalbo

[11] Patent Number: 5,652,005
[45] Date of Patent: *Jul. 29, 1997

[54] METHOD OF MAKING SANDWICH COOKIES FOR ICE CREAM, AND PRODUCT

[75] Inventor: Dennis J. Loalbo, Linden, N.J.

[73] Assignee: Interbake Foods Inc.

[*] Notice: The term of this patent shall not extend beyond the expiration date of Pat. No. 5,523,103.

[21] Appl. No.: 654,578

[22] Filed: May 29, 1996

Related U.S. Application Data

[63] Continuation of Ser. No. 9,017, Jan. 26, 1993, Pat. No. 5,523,103.
[51] Int. Cl.⁶ .................................................. A23G 3/00
[52] U.S. Cl. .................... 426/76; 420/94; 420/302; 420/446; 420/549
[58] Field of Search .................... 426/302, 559, 426/560, 564; 422/76, 549

[56] References Cited

U.S. PATENT DOCUMENTS

| | | | |
|---|---|---|---|
| 969,173 | 9/1910 | Loose . | |
| 3,779,772 | 12/1973 | Forkner | 99/86 |
| 4,627,555 | 12/1986 | Locke | 222/200 |
| 4,637,221 | 1/1987 | Levine . | |
| 5,523,103 | 6/1996 | Loalbo | 426/302 |

OTHER PUBLICATIONS

Sketch No. 1 Interbake Foods, Inc., Richmond, VA. 1992.
APV Crepaco, Inc., Chicago, Illinsopi, Brochure—Continuous Ingredient Feeders—Bulletin M–1–300 (undated).

Sketch No. 3 Matt's Bakery, Inc. (Matt Baking Company) 1348 Pennsylvania Ave., Brooklyn, NY 11239.

Sketch No. 2—kibbler, Interbake Foods, Inc., Richmond, VA 1992.

*Primary Examiner*—David A. Reifsnyder
*Attorney, Agent, or Firm*—Irvin A. Lavine; Nath & Associates

[57] ABSTRACT

A method of producing filled sandwich cookies to be fed by an auger into an ice cream stream to produce ice cream with filled cookies comprising baking dough in units of multiple cookie elements, of substantially round shape, applying filling to each cookie element of a portion of the units which have been produced, sandwiching other units onto the filling, and then separating the multiple sandwich cookie units into individual sandwich cookies; the units comprise multiple cookie elements of approximately round shape, and each of which is between one-half inch and seven eighths inch diameter, the units containing two rows with three cookies in each row, with juncture lines between adjacent cookies.

A filled sandwich cookie of approximately seven-eighths inch diameter and at least one rough broken edge to absorb moisture to render the cookie softer and more readily chewable, the filling being of icing; a multiple sandwich cookie unit comprising six such sandwich cookies arranged in two rows of three sandwich cookies each, with edge-providing juncture lines between the cookies.

15 Claims, 1 Drawing Sheet

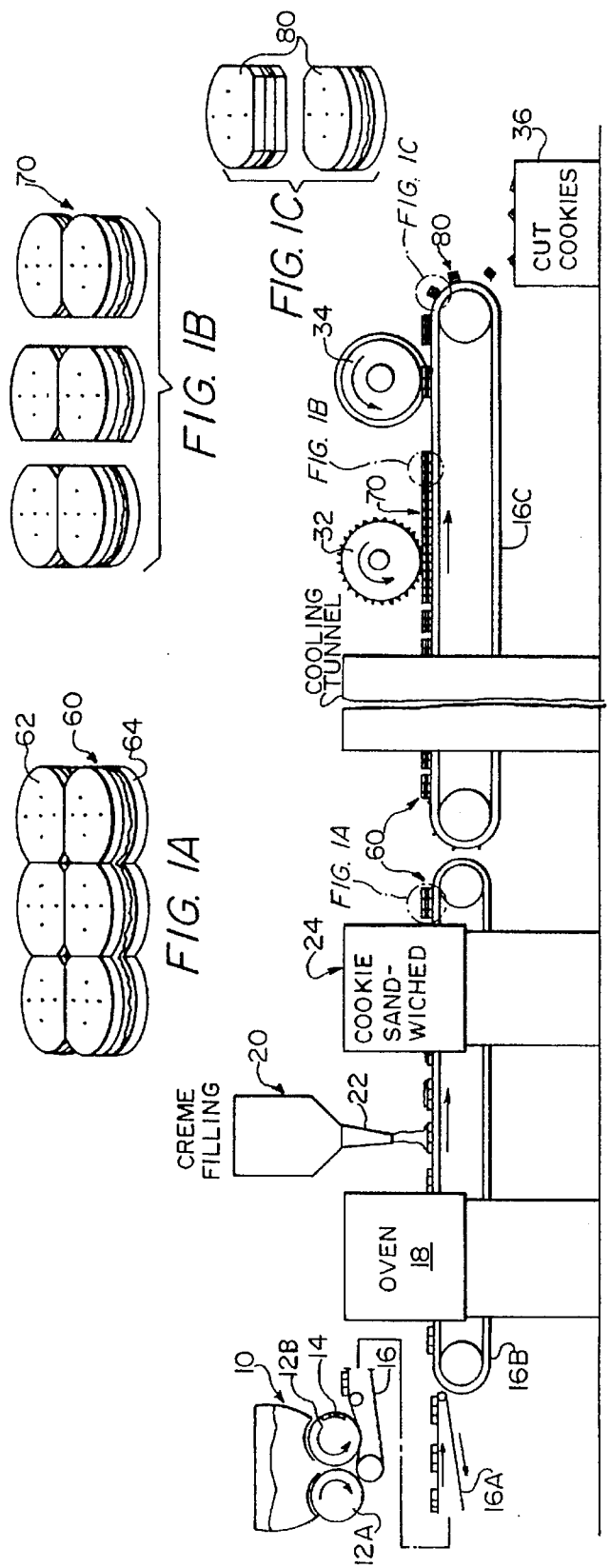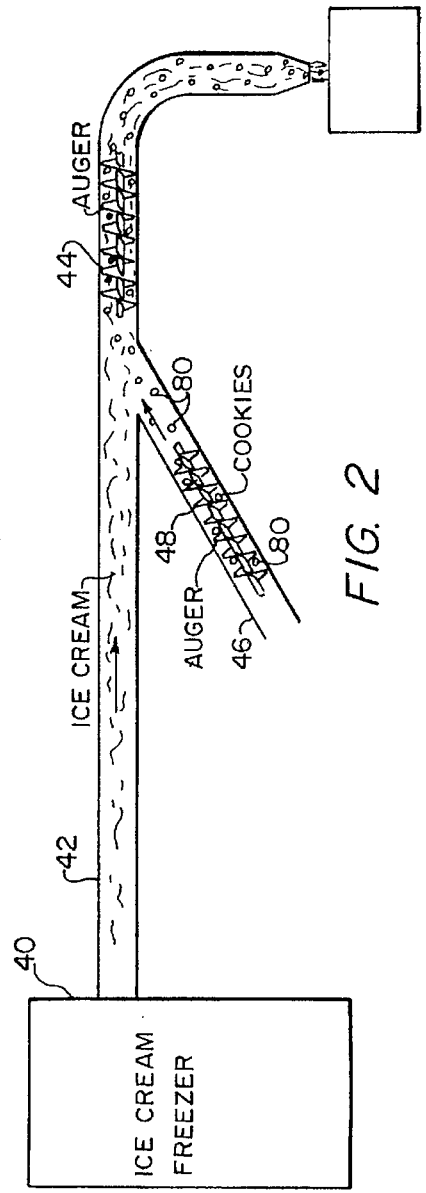

5,652,005

1

METHOD OF MAKING SANDWICH COOKIES FOR ICE CREAM, AND PRODUCT

This application is a continuation of U.S. patent application Ser. No. 08/009,017, filed Jan. 26, 1993 now U.S. Pat. No. 5,523,103.

BACKGROUND OF THE INVENTION

This invention pertains to the method of making sandwich cookies for incorporation into ice cream, the method of making sandwich cookies and incorporating them into ice cream, and to such sandwich cookies to be used in ice cream.

FIELD OF THE INVENTION

Ice cream has been produced for many decades, and has been and remains a very popular confection. Over the years, many variations and kinds of ice cream have been produced, the ice cream industry having experienced a great increase in the number of flavors, and more recently, the addition of edible materials to or on the ice cream. For example, there have been added to ice cream such products as peanut butter, jellies, and fruit. In addition, it is known that for over ten years baked products have been added to the ice cream, the baked product being specifically sandwich cookies with icing filling. This ice cream is known as "Cookies & Creme" ice cream.

Sandwich cookies have top and bottom layers of baked cookie dough, with a filling, preferably icing, between the cookie layers. Experience has shown over the past years that a number of problems have arisen in connection with the production of sandwich cookies for inclusion in ice cream, and in the making of "Cookies & Creme" ice cream.

DESCRIPTION OF RELATED ART

One method of producing sandwich cookies for inclusion in ice cream comprises the steps of baking cookie dough in an oven, to form round cookies of approximately one and three-quarter inches diameter. The cookies are delivered to commercial sandwich cookie making equipment which applies icing filler to one side of the cookie, and then places a second cookie, substantially identical to the first, on the icing filler to form a sandwich cookie. These sandwich cookies are then cooled, as in a cooling tunnel, to harden the icing filler.

After being cooled, the sandwich cookies are passed to equipment which breaks the cookies into smaller pieces, and those pieces which pass through a standard. U.S. screen size 18 or smaller are separated out, there being collected larger pieces of the broken sandwich cookies which will not pass through a U.S. screen size 4 or less. These broken cookie pieces are of suitable size to be eaten as part of ice cream and provide broken edges which absorb moisture and are therefore desirable because of the resulting softness of the cookie.

In the production of "Cookies & Creme" ice cream, ice cream is manufactured and passed through a conduit leading to packaging equipment. A tributary conduit has in it an auger, and the larger pieces of the broken sandwich cookies were fed to the auger, to be forced by it into the ice cream stream in the conduit.

These broken pieces of sandwich cookies carried with them so-called "fines". These "fines," which are crumbs from the cookies, or small broken pieces of the cookies, are undesirable because "Cookies & Creme" ice cream with fines is not readily accepted by the customer due both to appearance and to the taste or feel of the resulting ice cream with the fines in it.

2

Further handling would be required in order to eliminate as much of the "fines" as possible; this would require a further processing step estimated to increase costs more than 35%. Such process would involve sieves, which would likely lead to closure of the sieve opening; this would create a still further problem In the production of small pieces of sandwich cookies.

Another problem with the current practice of producing sandwich cookies and then breaking them or cutting them into smaller parts is that, in addition to the production of the above noted objectionable "fines", is that the breaking of the sandwich cookies results in an undesirably high amount of loss of the amount of the product produced. This is because the breaking or cutting of the cookie results in pieces which are too small to be used.

Another problem which has arisen in the production of "Cookies & Creme" ice cream using broken pieces of one and three-quarter inch diameter sandwich cookies is that the pieces will clog the feeding mechanism, i.e., the auger that supplies the cookie pieces to the ice cream stream.

An alternative method of using the above noted sandwich cookies of one and three-quarter inch diameter is to provide them to the ice cream producer without being broken. However, these unbroken one and three-quarter inch diameter sandwich cookies have clogged the feeding auger. When this occurs, a portion of the packaged ice cream is defective because it is without the sandwich cookies which are intended to be in it, and there consequently results a loss in production. This present system requires the added expense of monitoring the equipment for producing "Cookies & Creme" ice cream to ensure that the intended product is being produced, and in a consistent manner.

Another known method for producing sandwich cookies for "Cookies & Creme" ice cream has been the production of sandwich cookies of one and thirteen-sixteenths inches diameter, which are then cut into four quarters. The resulting pieces have rough edges, but there also results too much fines, because due to handling and transportation, as well as processing, these quarter-pieces engage other pieces and/or the handling equipment, resulting in breaking off of small crumbs from the rough edges, thereby producing the noted fines. Hence, the utilization of quarter-pieces of one and thirteen-sixteenth inches diameter sandwich cookies represents a further process which produces an unacceptable "Cookies & Creme" ice cream product.

In another process, sandwich cookies have been produced which are of even lesser diameter than those noted above. In this alternate method, there has been produced sandwich cookies which are one inch in diameter. This method, while eliminating the loss which is generated by the production of "fines" upon the breaking of cookies, has not been entirely successful because sandwich cookies of this size are broken in the ice cream production equipment, particularly in the auger for feeding cookies, so that while "fines" are not produced in the manufacture of the cookies, they are produced in the feeding of the cookies in the ice cream equipment. The "Cookies & Creme" ice cream produced by this method therefore has an unacceptable quantity of fines.

The production of sandwich cookies of approximately seven-eighths inch diameter has been known. This product is made on specially designed equipment, in which the individual cookies are manufactured independently, and are made into a sandwich cookie by utilizing equipment of a known type for producing sandwich cookies. These sandwich cookies have been used for direct consumption, and not as an ice cream ingredient. The utilization of such cookies by the dairy industry for the making of "Cookies & Creme" ice cream, would not be acceptable for the reason that the dairy industry requires or prefers that the sandwich cookies have broken edges, to absorb moisture to render the cookies softer and more readily chewable.

In summary, there have been utilized methods in which relatively large size sandwich cookies are produced and broken, with separation out of too-small pieces and fines; the production of somewhat smaller sandwich cookies which are divided into quarters which produces fines; and processes in which the cookie is even smaller, and while not broken in the process of producing the sandwich cookies, are found to break in the feeding auger of the ice cream plant, which also produces fines. This progression to smaller size cookies, to avoid breakage in either cookie production or ice cream production has been found not to have a logical progression into ever smaller size sandwich cookies. Production of cookies of less than one inch diameter requires special equipment, which would be economically unsatisfactory because either the price of this type of ice cream would have to be increased, or a suitable profit could not be achieved. A further deficiency is that the individually made cookies of smaller size have no broken edges, and so are unacceptable.

SUMMARY OF THE INVENTION

A method for producing sandwich cookies, and for producing ice cream including sandwich cookies, includes the baking of cookie dough units which contain multiple cookie elements, each cookie element having a maximum lateral dimension in the range of one-half inch to seven-eighths inch. In each unit, there are six such cookie elements, arranged in two rows, with three cookie elements in each row. The cookie elements are preferably round and each is contiguous with two or three adjacent cookie elements. An icing filling is applied to a portion of the cookie dough units, there being a body of icing filling applied to each of the cookie elements which forms the cookie dough unit. Then other baked cookie dough units are applied onto the filling, to provide multiple sandwich cookie units, and these multiple sandwich cookie units are then separated into individual sandwich cookies having a maximum lateral dimension or diameter of approximately seven-eighths inch. These sandwich cookies are then fed by an auger into a stream of ice cream to produce "Cookies & Creme" ice cream.

The products of the present invention include a multiple sandwich cookie unit having dimensions of approximately two and one-quarter inches by one and nine-sixteenth inches, and made up of six substantially round and unseparated cookie sandwiches, and a cookie sandwich as above described which is round, and of approximately seven-eighths inch diameter, and having two rough broken edges to absorb moisture.

Among the objects of the present invention are to provide a method for producing sandwich cookies, as for use in "Cookies & Creme" ice cream, which result in a minimum loss of product produced due to a lowered production of "fines" and unusable broken cookies; to produce sandwich cookies which will readily pass through existing machinery for producing ice cream with sandwich cookies therein; which will pass through such ice cream equipment without breakage of cookies and the production of "fines"; and to produce sandwich cookies which may utilize existing equipment for the production of sandwich cookies and which will produce sandwich cookies for use in ice cream machinery which will avoid breakage in such ice cream machinery, and/or the clogging of such machinery.

A still further object of the present invention is to provide a method for producing sandwich cookies of small regular size, with a significant amount of broken edges, and having few fines.

Another object of the present invention is to provide a method of producing a sandwich cookie for use primarily in "Cookies & Creme" ice cream in which there is a substantial broken edge region for absorption of moisture without a significant quantity of fines.

Further objects are to produce a multiple sandwich cookie unit which may be readily produced by existing equipment and which will provide sandwich cookies of suitable size, with minimum fines, and at least one rough broken edge, and to produce a sandwich cookie which is readily introduced into ice cream using existing equipment and which will become soft in the ice cream by absorbing moisture therefrom through a rough broken edge.

Other objects and many of the attendant advantages of the present invention will be readily understood from the accompanying specification, claims and drawings.

BRIEF DESCRIPTION OF THE DRAWINGS

FIG. 1 is a schematic view of apparatus for performing a method of producing sandwich cookies in accordance with the present invention.

FIG. 1A is a perspective view of a multiple sandwich cookie unit produced by a part of the method and apparatus shown in FIG. 1.

FIG. 1B is a perspective view of the multiple sandwich cookie unit shown in FIG. 1A, after breaking thereof into sub-units.

FIG. 1C is a perspective view of a sub-unit after it has been divided into individual sandwich cookies.

FIG. 2 is a schematic view of apparatus for producing ice cream containing sandwich cookies.

DESCRIPTION OF THE PREFERRED EMBODIMENT

Referring now to the drawings, wherein like or corresponding reference numerals are used for like or corresponding parts throughout the several views, there is shown in FIG. 1 an apparatus and method for producing sandwich cookies in accordance with the present invention.

A conventional rotary dough molder 10 comprises a pressure roller 12A and a die roller 12B with molds 14, located above one end of a molder apron 16A. The molds 14 are of conventional mechanical construction, including docking pins (not shown), and the molds are shaped to produce dough units comprising six cookie elements as hereinafter described. The dough units are delivered to a conveyor 16B which conveys them into and through an oven 18, in which the cookie dough units are baked. After passing through the oven 18, a creme filling apparatus 20 including multiple nozzle 22 discharges filling, preferably icing.

Since the dough unit has six cookies, there are six individuals nozzles making up the nozzle 22, arranged to deposit filling on each of the joined cookie elements.

The dough units, subsequent to the creme filling apparatus 20, pass through a conventional sandwiching apparatus 24 in which baked cookie dough units are placed on the filling F which has been applied to the baked cookie dough units in apparatus 20, and there issues from the sandwiching apparatus 20 multiple sandwich cookie units 60.

There is shown in FIG. 1A a perspective view of a filled multiple sandwich cookie unit 60 which comprises two rows of sandwich cookies with three sandwich cookies in each row. The top cookie dough layer 62 and the identical bottom cookie dough layer 64 is each made of six cookie elements 66 arranged in two rows of three. Each of the sandwich cookies forming a part of the unit 60 is approximately round, departing from a true round configuration by virtue of the more-than-tangential juncture between adjacent cookies. Each approximately round cookie element 66 has a lateral dimension, such as a modified "diameter", which is not substantially in excess of seven-eighth inches so as to enable it to pass through the auger of current ice cream producing equipment without substantial risk of breakage or the production of an unacceptably large amount of fines. The cookie element 66 preferably in order to provide manufacturing economy, since a sandwich cookie of lesser size would not produce a sufficient high level of production.

The length of the multiple sandwich cookie unit 60 is two and one-quarter inches and the Width in one and nine-sixteenth inches, in the preferred embodiment. The multiple sandwich cookie unit 60 having the foregoing dimensions is capable of being handled for further processing on existing equipment used in the baking industry, while producing sandwich cookie elements having the advantages described above and without significant production of fines.

The multiple sandwich cookie unit 60 in FIG. 1A includes straight, extended juncture lines between adjacent cookie elements 66. As will be appreciated, such juncture lines are representative; such precise juncture lines are rarely achievable with baked dough products.

The multiple sandwich cookie unit 60 is preferably cooled, as in a cooling tunnel 28, through which there passes a conveyor 16C. It will be appreciated that the showing in FIG. 1 is illustrative, particularly in the number of conveyors which may be provided in the apparatus for practicing the method.

The multiple sandwich cookie units 60, after passing through the cooling tunnel 28, are carried by the conveyor 30 beneath a pressure roll 32 which breaks the multiple sandwich cookie unit 60 into three two-part cookie sub-units 70, as shown in perspective in FIG. 1B. The sub-units 70 are then passed through a row of slitters 34 which divide the sub-units 70 into individual sandwich cookies 80, shown divided at their juncture lines from each other in FIG. 1C. The juncture lines provide desirable rough, broken, moisture absorbing edges on the sandwich cookies 80. The individual sandwich cookies 80 are collected into a suitable container 36, which may be used to store them and transport them.

There are a minimum of "fines" produced by the breaking of the multiple sandwich cookie units 60 into the sub-units 70 and also there is a minimum of "fines" produced by the slitting of the sub-units 70 into the individual sandwich cookies 80.

In FIG. 2, there is shown an ice cream freezer 40 having connected to it a conduit 42 which conveys a stream of the ice cream from freezer 40, drawn and propelled by an auger 44. Auger 44 may be a Model B-400 series blender with a continuous ingredient feeder manufactured by APV Crepaco, Inc., Chicago, Ill. A tributary conduit 46 has therein an auger 48 which receives sandwich cookies 80 and urges them into the ice cream stream within the conduit 42, and the ice cream with the individual sandwich cookies 80 therein is urged by the auger 44 into the discharge spout 46, where the "Cookies & Cream" ice cream 50 is deposited into a suitable container or containers 52.

The freezer 40, auger 44, conduit 46, and auger 48 are known and used in the production of "Cookies & Creme" ice cream 50. The individual sandwich cookies 80, having a maximum lateral dimension which is not substantially in excess of seven-eights inch, pass through the auger 48 without either clogging the auger or being broken by it. Consequently, there are substantially no broken sandwich cookies and substantially no "fines" present in the ice cream 50. The individual sandwich cookies 80 preferably have a maximum lateral dimension which is not less than one-half inch, because smaller sandwich cookies would be too small to achieve a suitable cookie output per unit of time. The rough broken edges of the sandwich cookies 80 absorb moisture so as to render the cookies softer and more readily chewable.

There has been provided a method for producing sandwich cookies and a method of adding such sandwich cookies to an ice cream stream which cause a minimum loss of the product which is produced. The herein disclosed method for making sandwich cookies results in a minimal production of "fines" and consequently a minimal loss of produced product, as well as the avoidance of introduction of "fines" into ice cream containing the sandwich cookies.

Further, the herein disclosed method utilizes existing machinery and equipment in the baking industry and in the ice cream industry for producing ice cream with sandwich cookies therein, and is a method which produces Cookies which cause no significant breakage of cookies in the ice cream production equipment, nor the creation of an unsatisfactory amount of fines in the ice cream production equipment.

The herein disclosed method not only avoids the production of an unsatisfactory amount of "fines" in the production of sandwich cookies, but in addition produces sandwich cookies permitting the use of existing equipment without significant modification.

There has also been provided a sandwich cookie uniquely suitable for handling by existing equipment in the ice cream industry for the production of "Cookies & Creme" ice cream with minimal clogging of equipment, breaking of cookies in the equipment, or the production of an unsatisfactory quantity of "fines" in the ice cream production equipment.

Still further, there has been provided a multiple sandwich cookie unit which may be readily produced on existing bakery industry equipment, and which will result in a high volume of acceptable product from the total quantity of product produced by the baking equipment.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A method of producing filled sandwich cookies suitable for introduction into the feed auger of ice cream producing equipment to produce ice cream with filled sandwich cookies therein, said filled sandwich cookies being shaped, sized and dimensioned to minimize the production of fines in ice cream producing equipment, said method comprising:

(a) baking dough in units of multiple cookie elements, each cookie element in said unit having a maximum lateral dimension of approximately seven-eighths inch and having at least one juncture line with an adjacent cookie element, (b) applying filling to each said cookie element, (c) sandwiching other said units onto said filling to provide filled multiple sandwich cookies of said maximum lateral dimension, and (d) separating said multiple sandwich cookie units at each said juncture line between adjacent cookie elements into individual sandwich cookies, so that each said produced sandwich cookie has at least one rough broken edge on each cookie element for enabling the absorption of moisture into each said cookie element of said filled sandwich cookie through said rough broken edge.

2. The method according to claim 1, said baking is of units with the cookie element minimum lateral dimension being not less than approximately one-half inch.

3. The method according to claim 1, wherein said baking is of units in which the cookie elements are substantially round.

4. The method according to claim 1, wherein said baking is of units having two rows of three cookie elements in each row.

5. The method according to claim 1, wherein said baking is of cookie elements which are substantially round.

6. A sandwich cookie for use in making ice cream containing cookies, said sandwich cookie being shaped, sized and dimensioned to minimize the production of fines in ice cream producing equipment, said sandwich cookie comprising:

first and second baked cookies in spaced relationship and having a filling between them, said sandwich cookie having a maximum lateral dimension of approximately seven-eighths inch, and having at least one rough broken edge for absorbing moisture therethrough.

7. The sandwich cookie according to claim 6, said sandwich cookie being substantially round.

8. The sandwich cookie of claim 7, wherein said broken edge of said substantially round sandwich cookie is substantially straight.

9. The sandwich cookie according to claim 6, wherein said sandwich cookie has a minimum lateral dimension not substantially less than one-half inch.

10. A sandwich cookie in accordance with claim 6, wherein each of said baked cookies of said sandwich cookie has at least one broken edge.

11. A multiple sandwich cookie unit for use in making ice cream containing cookies, said multiple sandwich cookie unit comprising plural sandwich cookies, each sandwich cookie of said sandwich cookie unit being shaped, sized and dimensioned to minimize the production of fines in ice cream producing equipment, and each sandwich cookie comprising two cookie dough layers with filling between them, each said sandwich cookie having a juncture line with each adjacent sandwich cookie, each sandwich cookie of said multiple sandwich cookie unit having a maximum lateral dimension of approximately seven-eighths inch, said multiple sandwich cookie unit being readily divided to provide individual sandwich cookies each having at least one rough broken edge for absorbing moisture therethrough on each said cookie dough layer.

12. The multiple sandwich cookie unit according to claim 11, said sandwich cookies being arranged in two rows having three sandwich cookies in each row.

13. The multiple sandwich cookie unit according to claim 12, each said sandwich cookie being substantially round.

14. The multiple sandwich cookie unit according to claim 11, each said sandwich cookie being substantially round.

15. A sandwich cookie in accordance with claim 11, said sandwich cookie having a minimum lateral dimension of approximately one-half inch.

\* \* \* \* \*